UNITED STATES PATENT OFFICE 2,648,681

PROCESS FOR THE PRODUCTION OF A RODENTICIDAL COMPOSITION

Franz Litvan and Willy Stoll, Basel, Switzerland, assignors to J. R. Geigy A. G., Basel, Switzerland, a Swiss firm No Drawing. Application June 4, 1951, Serial No. 229,871. In Switzerland July 25, 1950

2 Claims. (Cl. 260—343.2)

In view of their capacity to retard the coagulation of the blood and to render the capillaries permeable, 3 - ($\alpha$ - phenyl- $\beta$ -acetylethyl) -4-hydroxycoumarin obtained by the addition of 4-hydroxycoumarin to styrylmethyl ketone and also some related compounds, may be used as rodenticides. The addition reaction can take place in water, alcohol or pyridine; yields of at most about 45% are obtained. (M. Ikawa, M. A. Stahmann and K. P. Link, J. Am. Chem. Soc. 66, 902 (1944).)

It has now been found that the raw product obtained by melting together substantially equimolecular amounts of 4-hydroxycoumarin and benzalacetone is also as active as the pure 3-($\alpha$-penyl-$\beta$-acetylethyl) - 4 - hydroxycoumarin. The raw product is obtained by heating the components together for several hours to above the aggregate melting point, but to at least 120° C. without solvents or liquid diluents.

The new process, therefore, gives not only a considerably simplified method but also, from a biological point of view, gives an increase of about double the yield.

It is also of great practical importance for the practical application of the active mixture produced according to the present invention that the side products contained in the raw product, like the main product of the process, have no warning or deterrent action on the pests which are to be combatted. As the raw active mixture in addition is of a solid consistency, it can be used in the same way and in the same low concentrations as the pure 3-($\alpha$-aryl-$\beta$-acylethyl)-4-hydroxycoumarin for the preparation of rodenticides of all kinds.

The following example serves to illustrate the invention. Parts are always given as parts by weight and the temperatures are in degrees centigrade.

*Example*

16 parts of 4-hydroxycoumarin and 15 parts of benzal-acetone after being thorough mixed are heated for 8–10 hours in an oil bath, the temperature of which is 135–140°. The hot melt is poured out and, on pulverising after cooling, a yellow powder is obtained. Instead of 16 parts of 4-hydroxycoumarin, a weak excess can also be used, e. g. 20 parts.

What we claim is:

1. Process for the preparation of a crude rodenticidal mixture consisting in melting together substantially equimolecular proportions of 4-hydroxycoumarin and benzalacetone in the absence of any liquid diluent, heating the melt at a temperature of at least 120° for several hours and pulverising the solid crude reaction product when cold.

2. Process for the preparation of a crude rodenticidal mixture consisting in melting together substantially equimolecular proportions of 4-hydroxycoumarin and benzalacetone in the absence of any liquid diluent, heating the melt at a temperature of 135–140° for about 10 hours, and pulverising the solid crude reaction product when cold.

FRANZ LITVAN.
WILLY STOLL.

References Cited in the file of this patent

UNITED STATES PATENTS

| Number | Name | Date |
|---|---|---|
| 2,427,578 | Stahmann et al. | Sept. 16, 1947 |

OTHER REFERENCES

Stahmann et al., article in J. Am. Chem. Soc., vol. 66, pp. 902–906 (1944).

"Soap and Sanitary Chemical," February 1950, article by Crabtree, pp. 131, 133, 135 and 147.